(12) United States Patent
Koharagi et al.

(10) Patent No.: US 6,917,133 B2
(45) Date of Patent: Jul. 12, 2005

(54) AIR CONDITIONER HAVING PERMANENT MAGNET ROTATING ELECTRIC MACHINE

(75) Inventors: Haruo Koharagi, Taga-gun (JP);
Masaharu Senoh, Narashino (JP);
Keiji Noma, Inba-gun (JP); Kohei Ishii, Tokyo (JP); Kazuo Sato, Sakura (JP); Satoshi Kikuchi, Hitachi (JP);
Miyoshi Takahashi, Hitachi (JP);
Kouki Yamamoto, Hitachinaka (JP)

(73) Assignee: Hitachi, Ltd., Tokyo (JP)

( * ) Notice: Subject to any disclaimer, the term of this patent is extended or adjusted under 35 U.S.C. 154(b) by 238 days.

(21) Appl. No.: 10/368,414

(22) Filed: Feb. 20, 2003

(65) Prior Publication Data

US 2003/0178905 A1 Sep. 25, 2003

Related U.S. Application Data

(63) Continuation-in-part of application No. 09/793,750, filed on Feb. 27, 2001, now Pat. No. 6,525,442.

(30) Foreign Application Priority Data

Aug. 29, 2000 (JP) ........................................ 2000-259558

(51) Int. Cl.⁷ .............................................. H02K 21/12
(52) U.S. Cl. ............................ 310/156.57; 310/156.53; 310/156.56; 310/156.48
(58) Field of Search ....................... 310/156.48, 156.49, 310/156.53–156.57, 254

(56) References Cited

U.S. PATENT DOCUMENTS

| | | | |
|---|---|---|---|
| 3,840,763 A | | 10/1974 | Baumann et. al. |
| 4,687,608 A | * | 8/1987 | Eino ........................... 427/130 |
| 5,369,325 A | | 11/1994 | Nagata et al. |
| 6,008,559 A | | 12/1999 | Asano et al. |
| 6,025,667 A | * | 2/2000 | Narita et al. ........... 310/156.53 |
| 6,087,751 A | | 7/2000 | Sakai |
| 6,087,752 A | | 7/2000 | Kim et al. |
| 6,147,428 A | | 11/2000 | Takezawa et al. |
| 6,340,857 B2 | | 1/2002 | Nishiyama et al. |
| 6,441,525 B1 | * | 8/2002 | Koharagi et al. ...... 310/156.56 |
| 6,525,442 B2 | * | 2/2003 | Koharagi et al. ...... 310/156.48 |

FOREIGN PATENT DOCUMENTS

| | | | | |
|---|---|---|---|---|
| EP | 322804 | * | 7/1989 | .......... H02K/21/08 |
| JP | 5-091684 | | 4/1993 | |
| JP | 7-336917 | | 12/1995 | |
| JP | 9-163649 | | 6/1997 | |
| JP | 11-341719 | | 12/1999 | |
| JP | 2001-251825 | | 9/2001 | |
| JP | 2001-327130 | | 11/2001 | |

* cited by examiner

Primary Examiner—Tran Nguyen
(74) Attorney, Agent, or Firm—Antonelli, Terry, Stout & Kraus, LLP

(57) ABSTRACT

An air conditioner comprising a compressor including a compression unit and a permanent magnet rotating electric machine, wherein the permanent magnet rotating electric machine includes a stator, into which concentratively wound armature windings are inserted in such a way as to surround a plurality of teeth formed in a stator core, and a rotor having permanent magnets accommodated into a plurality of permanent magnet inserting holes formed in a rotor core. Each pair of adjacent ones of said permanent magnets is arranged generally in one of a convex V-shaped configuration and a convex U-shaped configuration with respect to a rotor axis, and a substantially V-shaped recess portion is formed between adjacent poles in outer circumferential surface portions of the rotor core.

36 Claims, 12 Drawing Sheets

AIR CONDITIONER HAVING PERMANENT MAGNET ROTATING ELECTRIC MACHINE

CROSS REFERENCE TO RELATED APPLICATION

This application is a continuation-in-part application of U.S. application Ser. No. 09/793,750, filed Feb. 27, 2001, now U.S. Pat. No. 6,525,442, the subject matter of which is incorporated by reference herein.

BACKGROUND OF THE INVENTION

1. Field of the Invention

The present invention generally relates to a permanent magnet rotating electric machine and, more particularly, to a permanent magnet rotating electric machine to be mounted on a compressor of an air conditioner.

2. Description of the Related Art

Hitherto, such kinds of permanent magnet rotating electric machines have employed permanent magnets of various shapes. For example, Japanese Unexamined Patent Application Publication No. 6-339241 describes a permanent magnet rotating electric machine that comprises a stator, into which concentratively wound armature windings are inserted in such a way as to surround a plurality of teeth formed in a stator core, and a rotor having permanent magnets accommodated into a plurality of permanent magnet inserting holes formed in a rotor core, thereby enhancing an output of the rotating electric machine by utilizing reluctance torque.

The aforementioned conventional permanent magnet rotating electric machine comprises a stator, into which concentratively wound armature windings are inserted in such a way as to surround a plurality of teeth formed in a stator core, and a rotor having permanent magnets accommodated into a plurality of permanent magnet inserting holes formed in a rotor core, thereby enhancing the efficiency of the However, the conventional permanent magnet rotating electric machine has a drawback in that the adoption of the concentrated windings results in reduction in an effective range of induced voltages, and that when the rotating electric machine is driven by a position sensorless inverter in the case of 120 degree energization, a position sensor signal due to the induced voltage is not obtained and thus the rotating electric machine is out of working order.

Accordingly, an object of the present invention is to provide a permanent magnet rotating electric machine using a stator employing concentrated windings and a magnet-embedded rotor, which can be stably driven even when driven by a position sensorless inverter in the case of 120 degree energization.

SUMMARY OF THE INVENTION

To achieve the foregoing object, according to an aspect of the present invention, there is provided a permanent magnet rotating electric machine that comprises a stator, into which concentratively wound armature windings are inserted in such a way as to surround a plurality of teeth formed in a stator core, and a rotor having permanent magnets accommodated into a plurality of permanent magnet inserting holes formed in a rotor core. In this machine, each pair of adjacent ones of permanent magnets is arranged like a convex V or the permanent magnets are convex and U-shaped with respect to a rotor axis. Moreover, a nearly V-shaped recess portion is formed between adjacent poles in outer circumferential surface portions of the rotor core.

Further, according to another aspect of the present invention, there is provided a permanent magnet rotating electric machine that comprises a stator, into which concentratively wound armature windings are inserted in such a way as to surround a plurality of teeth formed in a stator core, and a rotor having permanent magnets accommodated into a plurality of permanent magnet inserting holes formed in a rotor core. In this machine, each pair of adjacent ones of the permanent magnets is arranged like a convex V or the permanent magnets are convex and U-shaped with respect to a rotor axis. Moreover, a nearly V-shaped recess portion is formed between adjacent poles in outer circumferential surface portions of the rotor core. Furthermore, a plurality of slits radially extending in the rotor are formed in an outer circumferential portion, which is located outwardly from the permanent magnets, of the rotor core.

Moreover, according to another aspect of the present invention, there is provided a permanent magnet rotating electric machine that comprises a stator, into which concentratively wound armature windings are inserted in such a way as to surround a plurality of teeth formed in a stator core, and a rotor having permanent magnets accommodated into a plurality of permanent magnet inserting holes formed in a rotor core. In this machine, a slit radially extending in the rotor is formed in a central portion of each of the teeth of the stator core. Further, each pair of adjacent ones of permanent magnets is arranged like a convex V or the permanent magnets are convex and U-shaped with respect to a rotor axis. Moreover, a nearly V-shaped recess portion is formed between adjacent poles in outer circumferential surface portions of the rotor core.

According to another aspect of the present invention, there is provided a permanent magnet rotating electric machine that comprises a stator, into which concentratively wound armature windings are inserted in such a way as to surround a plurality of teeth formed in a stator core, and a rotor having permanent magnets accommodated into a plurality of permanent magnet inserting holes formed in a rotor core. In this machine, a slit radially extending in the rotor is formed in a central portion of each of the teeth of the stator core. Further, each pair of adjacent ones of the permanent magnets is arranged like a convex V or the permanent magnets are convex and U-shaped with respect to a rotor axis. Moreover, a nearly V-shaped recess portion is formed between adjacent poles in outer circumferential surface portions of the rotor core. Furthermore, a plurality of slits radially extending in the rotor are formed in an outer circumferential portion, which is located outwardly from the permanent magnets, of the rotor core.

To achieve the foregoing object, according to another aspect of the present invention, there is provided a permanent magnet rotating electric machine that comprises a stator, into which concentratively wound armature windings are inserted in such a way as to surround a plurality of teeth formed in a stator core, and a rotor having permanent magnets accommodated into a plurality of permanent magnet inserting holes formed in a rotor core. In this machine, each pair of adjacent ones of the permanent magnets is arranged like a convex V or the permanent magnets are convex and U-shaped with respect to a rotor axis. Moreover, a plurality of nearly V-shaped recess portions, each of which is placed between adjacent poles of each pair, are formed in outer circumferential surface portions of the rotor core.

Further, according to another aspect of the present invention, there is provided a permanent magnet rotating electric machine that comprises a stator, into which concentratively wound armature windings are inserted in such a way as to surround a plurality of teeth formed in a stator core, and a rotor having permanent magnets accommodated into a plurality of permanent magnet inserting holes formed in a rotor core. In this machine, each pair of adjacent ones of the permanent magnets is arranged like a convex V or the permanent magnets are convex and U-shaped with respect to a rotor axis. Moreover, a plurality of nearly V-shaped recess portions, each of which is placed between adjacent poles, are formed in outer circumferential surface portions of the rotor core. Furthermore, a plurality of slits radially extending in the rotor are formed in an outer circumferential portion, which is located outwardly from the permanent magnets, of the rotor core.

Moreover, according to another aspect of the present invention, there is provided a permanent magnet rotating electric machine that comprises a stator, into which concentratively wound armature windings are inserted in such a way as to surround a plurality of teeth formed in a stator core, and a rotor having permanent magnets accommodated into a plurality of permanent magnet inserting holes formed in a rotor core. In this machine, each pair of adjacent ones of the permanent magnets is arranged like a convex V or the permanent magnets are convex and U-shaped with respect to a rotor axis. Moreover, a plurality of nearly L-shaped recess portion s, each of which is placed between adjacent poles of each pair, are formed in outer circumferential surface portions of the rotor core.

According to another aspect of the present invention, there is provided a permanent magnet rotating electric machine that comprises a stator, into which concentratively wound armature windings are inserted in such a way as to surround a plurality of teeth formed in a stator core, and a rotor having permanent magnets accommodated into a plurality of permanent magnet inserting holes formed in a rotor core. In this machine, each pair of adjacent ones of the permanent magnets is arranged like a convex V or the permanent magnets are convex and U-shaped with respect to a rotor axis. Further, a plurality of nearly L-shaped recess portions, each of which is placed between adjacent poles, are formed in outer circumferential surface portions of the rotor core. Furthermore, a plurality of slits radially extending in the rotor are formed in an outer circumferential portion, which is located outwardly from the permanent magnets, of the rotor core.

To achieve the foregoing object, according to another aspect of the present invention, there is provided a permanent magnet rotating electric machine that comprises a stator, into which concentratively wound armature windings are inserted in such a way as to surround a plurality of teeth formed in a stator core, and a rotor having permanent magnets accommodated into a plurality of permanent magnet inserting holes formed in a rotor core. In this machine, a slit radially extending in the rotor is formed in a central portion of each of the teeth of the stator core. Further, each pair of adjacent ones of the permanent magnets is. arranged like a convex V or the permanent magnets are convex and U-shaped with respect to a rotor axis. Moreover, a plurality of nearly V-shaped recess portions, each of which is placed between adjacent poles of each pair, are formed in outer circumferential surface portions of the rotor core.

Further, according to another aspect of the present invention, there is provided a permanent magnet rotating electric machine that comprises a stator, into which concentratively wound armature windings are inserted in such a way as to surround a plurality of teeth formed in a stator core, and a rotor having permanent magnets accommodated into a plurality of permanent magnet inserting holes formed in a rotor core. In this machine, a slit radially extending in the rotor is formed in a central portion of each of the teeth of the stator core. Further, the each pair of adjacent ones of the permanent magnets is arranged like a convex V or the permanent magnets are convex and U-shaped with respect to a rotor axis. Moreover, a plurality of nearly V-shaped recess portions, each of which is placed between adjacent poles, are formed in outer circumferential surface portions of the rotor core. Furthermore, a plurality of slits radially extending in the rotor are formed in an outer circumferential portion, which is located outwardly from the permanent magnets of the rotor core.

Moreover, according to another aspect of the present invention, there is provided a permanent magnet rotating electric machine that comprises a stator, into which concentratively wound armature windings are inserted in such a way as to surround a plurality of teeth formed in a stator core, and a rotor having permanent magnets accommodated into a plurality of permanent magnet inserting holes formed in a rotor core. In this machine, a slit radially extending in the rotor is formed in a central portion of each of the teeth of the stator core. Further, each pair of adjacent ones of the permanent magnets is arranged like a convex V or the permanent magnets are convex and U-shaped with respect to a rotor axis. Moreover, a plurality of nearly L-shaped recess portion s, each of which is placed between adjacent poles of each pair, are formed in outer circumferential surface portions of the rotor core.

According to another aspect of the present invention, there is provided a permanent magnet rotating electric machine that comprises a stator, into which concentratively wound armature windings are inserted in such a way as to surround a plurality of teeth formed in a stator core, and a rotor having permanent magnets accommodated into a plurality of permanent magnet inserting holes formed in a rotor core. In this machine, a slit radially extending in the rotor is formed in a central portion of each of the teeth of the stator core. Further, each pair of adjacent ones of the permanent magnets is arranged like a convex V or the permanent magnets are convex and U-shaped with respect to a rotor axis. Moreover, a plurality of nearly L-shaped recess portion s, each of which is placed between adjacent poles of each pair, are formed in outer circumferential surface portions of the rotor core. Furthermore, a plurality of slits radially extending in the rotor are formed in an outer circumferential portion, which is located outwardly from the permanent magnets, of the rotor core.

In the permanent magnet rotating electric machine of the present invention, a convex portion core may be placed between nearly V-shaped or L-shaped concave portions formed in outer circumferential surface portions of the rotor core. Moreover, the width of an innermost-circumference-side part of the convex portion core may be made to be larger than an outermost-circumference-side circumferential distance between the permanent magnet inserting holes.

Incidentally, let $\theta_2$ denote an angle between segments respectively drawn from the rotor axis to both points of intersection of the outer circumferential surface of the rotor core 8 and the V-shaped or L-shaped recess portion. Further, let $\theta_4$ designate a value obtained by dividing 360 (deg.) by the number of poles. In one of the aforementioned permanent magnet rotating electric machines, preferably, a ratio $(\theta_2/\theta_4)$ is set so that $66.7\% \leq (\theta_2/\theta_4) \leq 85.7\%$.

When the rotating electric machine is driven by using the position sensorless inverter in the case of 120 degree energization, a rotor position is detected by sensing an induced voltage in the rotating electric machine. That is, differently from a 120-degree energization section, an induced voltage appears between the terminals of the rotating electric machine in a 30-degree non-energization section. The rotor position is detected from a zerocross point thereof.

An armature current flows through the windings. Thus, it is necessary to perform commutation thereof in the 30 degree non-energization section. However, the concentrated windings have high inductance. Moreover, the range of induced voltages is narrow. Thus, the armature current cannot quickly be reduced.

As a countermeasure against this, it is considered that the inductance of the wirings is reduced.

However, the leakage inductance of the windings themselves are regulated owing to the structural conditions. Moreover, the magnitude thereof is low. Therefore, it is sufficient for reducing the inductance of the windings to reduce inductance called "q-axis inductance", which is generated according to the coupling between the rotor core and the armature windings.

The present invention is based on this principle. The leakage magnetic flux of the permanent magnets is reduced by arranging the permanent magnets like convex Vs with respect to the rotor axis and by providing nearly V-shaped recess portions each of which is formed in the outer circumferential portion of the rotor core and between adjacent poles. Thus, torque due to magnetic flux generated by the permanent magnets is increased. Moreover, armature reaction magnetic flux produced by an armature current is reduced.

Thus, the q-axis inductance decreases. Furthermore, the armature current commutation is quickly achieved. Consequently, according to the present invention, there is provided a permanent magnet rotating electric machine that can stably be driven even when the electric machine is driven by the position sensorless inverter in the case of 120 degree energization.

BRIEF DESCRIPTION OF THE DRAWINGS

Other features, objects and advantages of the present invention will become apparent from the following description of preferred embodiments with reference to the drawings in which like reference characters designate like or corresponding parts throughout several views, and in which.

DETAILED DESCRIPTION OF THE PREFERRED EMBODIMENTS

First Embodiment

Figure 1:
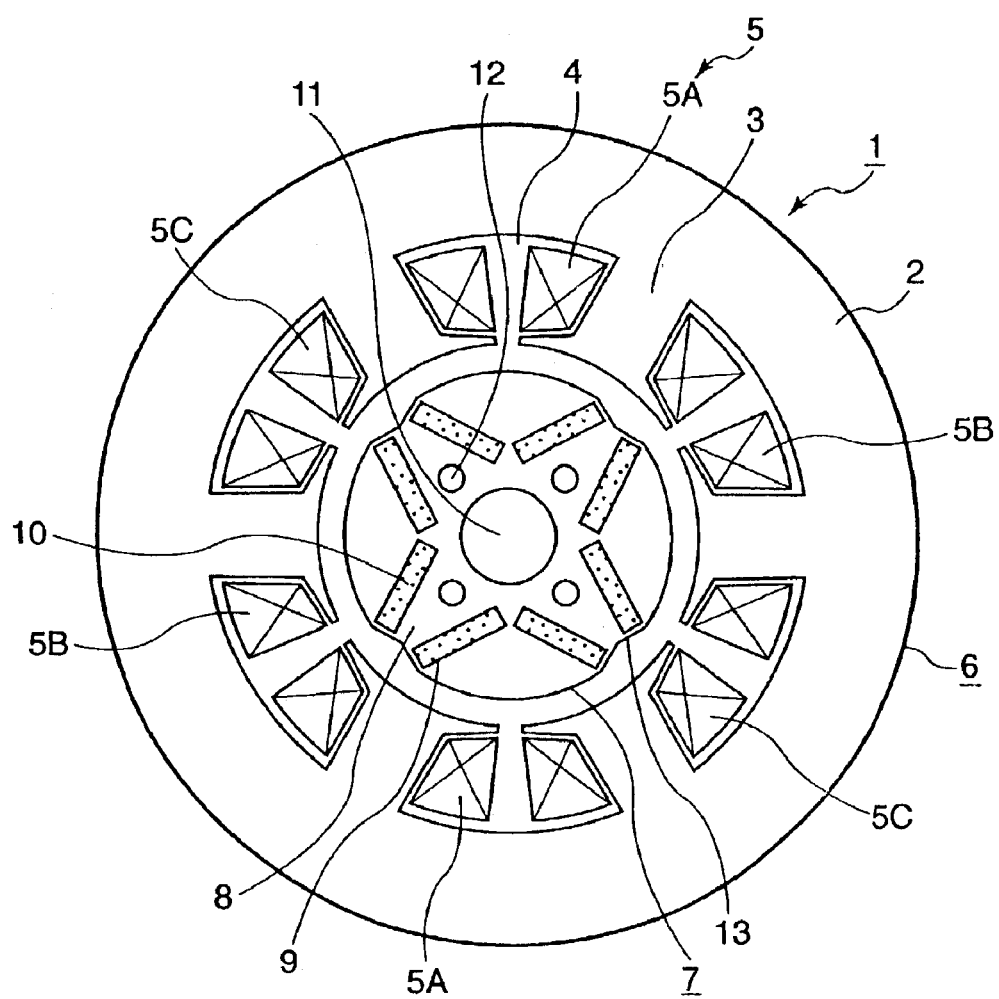
FIG. 1 is a radially sectional view of a permanent magnet rotating electric machine according to a first embodiment of the present invention.

FIG. 1 is a radially sectional view of a permanent magnet rotating electric machine according to a first embodiment of the present invention. In the first embodiment, a stator 6 of a permanent magnet rotating electric machine 1 comprises a stator core 2, and armature windings 5 wound in a plurality of slots 4 that are formed in the stator core 2 together with teeth 3. The armature windings 5 include concentrated U-phase windings 5A, concentrated V-phase windings 5B, and concentrated W-phase windings 5C. The rotor 7 of the permanent magnet rotating electric machine 1 comprises a rotor core 8, and permanent magnets 10, each pair of adjacent ones of which are respectively placed in permanent magnet inserting holes 9 that are arranged like a letter "V" and formed in the rotor core 8. A shaft fitting hole 11, into which the shaft (not shown) is fitted, is formed in the rotor core 8. Incidentally, the permanent magnets 10 are arranged therein so that the first embodiment has a four-pole stator.

Figure 2:
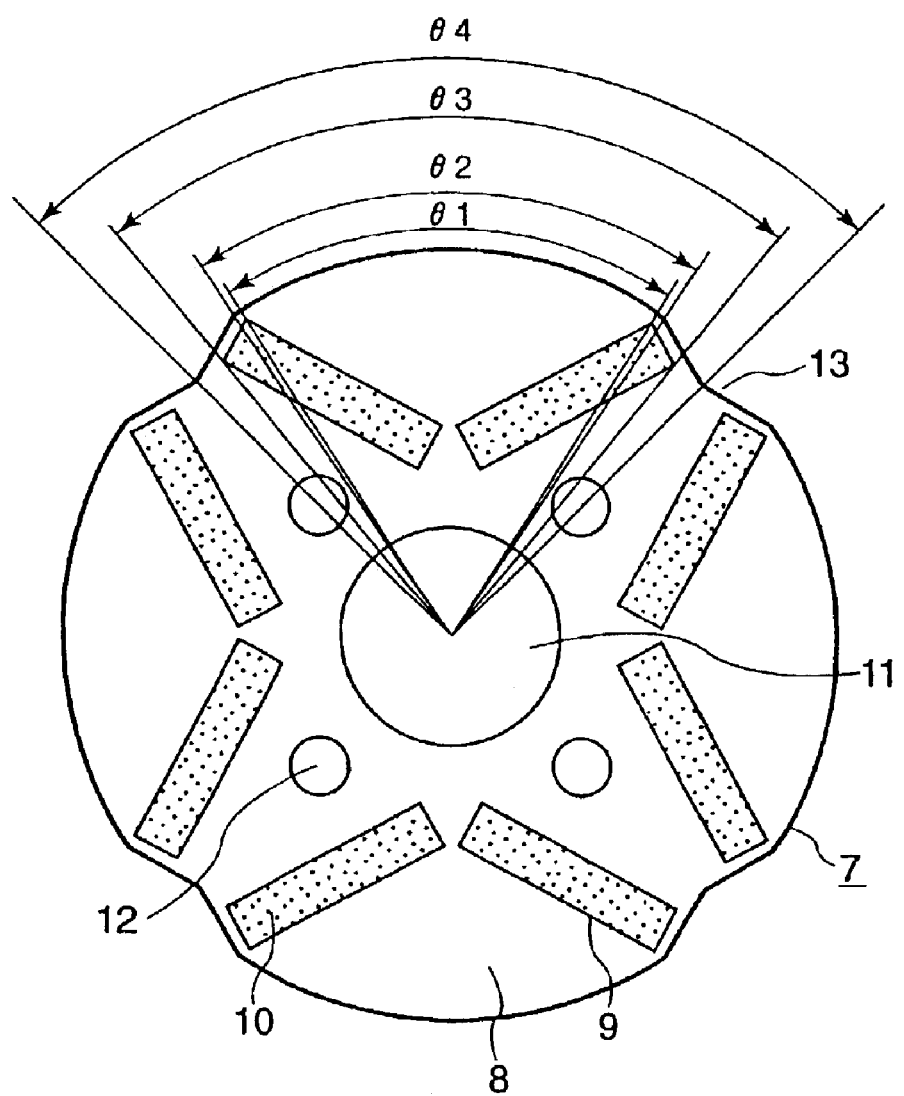
FIG. 2 is an enlarged radially sectional view of a rotor 7 shown in FIG. 1.

FIG. 2 is an enlarged radially sectional view of the rotor 7 shown in FIG. 1. As shown in FIG. 2. rivet holes 12 for fixing the rotor core 8, and V-shaped recess portions 13 provided between the adjacent permanent magnets arranged like a letter "V" are formed in the rotor 7. Incidentally, let $\theta_2$ denote an angle between segments respectively drawn from the rotor axis to both points of intersection of the outer circumferential surface of the rotor core 8 and the V-shaped recess portion. Further, let $\theta_1$ denote an angle between segments respectively drawn from the rotor axis to both the outermost-circumferential-side inner end surfaces 9 of the adjacent inserting holes arranged like a letter "V". The rotor 8 is configured so that $\theta_1 < \theta_2$. Furthermore, let $\theta_4$ designate a value obtained by dividing 360 (deg.) by the number of poles. In this case, the first embodiment is set so that $66.7\% \leq (\theta_2/\theta_4) \leq 85.7\%$.

Figure 3:
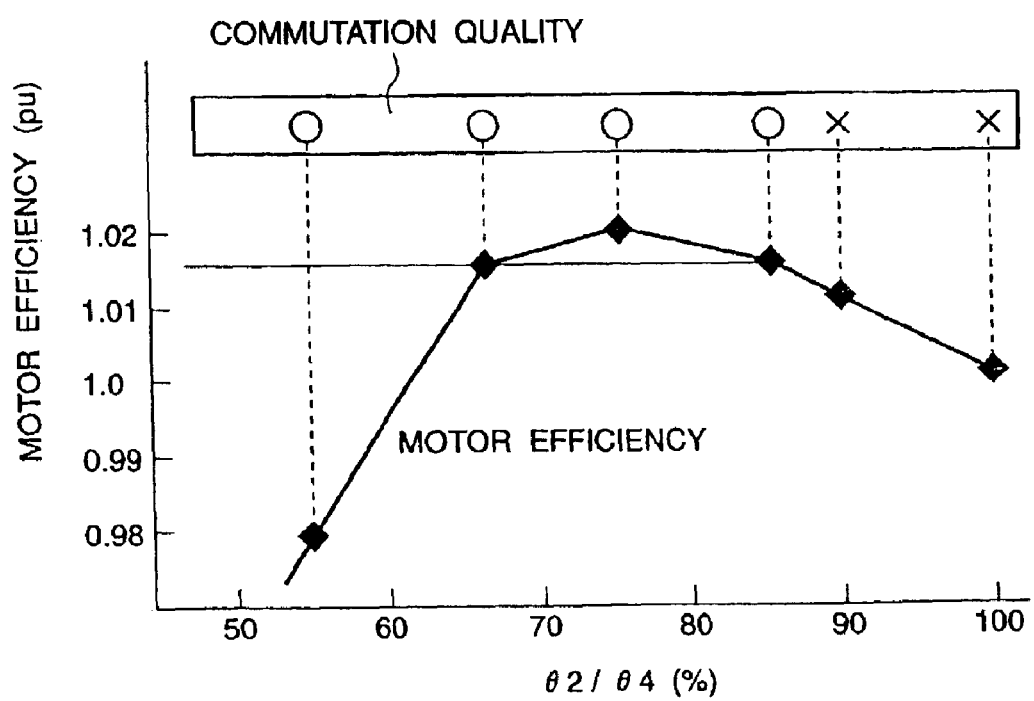
FIG. 3 is a graph illustrating the characteristics of the rotating electric machine according to the first embodiment of the present invention.

FIG. 3 is a graph illustrating the characteristics of the rotating electric machine according to the first embodiment of the present invention. Abscissas represent the ratio $(\theta_2/\theta_4)$ normalized by assuming that the value of this ratio is 100% when the recess portions 13 are not provided. Ordinates represent motor efficiency normalized by assuming that the efficiency is 1.0 pu. FIG. 3 also shows a result of study performed on commutation quality.

Regarding the commutation quality, a white circle indicates a state in which a position sensor signal due to an induced voltage is stably obtained and the waveform of an armature current is stable during the rotating electric machine is driven by a position sensorless inverter in the case of 120 degree energization. In contrast, a cross indicates a state in which the intervals of position sensor signals due to induced voltages are not uniform and a peak appears in the waveform of the armature current and the rotating speed is unstable during the rotating electric machine is driven by the position sensorless inverter in the case of 120 degree energization.

Results shown in FIG. 3 reveal that when the ratio ($\theta_2/\theta_4$) is 100% or 90%, a commutation operation is unstable, and the motor efficiency is enhanced by providing the recess portions 13 in the rotor 7.

In contrast, when the ratio ($\theta_2/\theta_4$) is 85.70%, a commutation operation is stable, and providing the recess portions 13 therein enhances the motor efficiency.

When the rotating electric machine is driven by using the position sensorless inverter in the case of 120 degree energization, a rotor position is detected by sensing an induced voltage in the rotating electric machine. That is, differently from a 120-degree energization section, an induced voltage appears between the terminals of the rotating electric machine in a 30-degree non-energization section. The rotor position is detected from a zerocross point thereof.

An armature current flows through the windings. Thus, it is necessary to perform commutation thereof in the 30 degree non-energization section. However, the concentrated windings have high inductance. Moreover, the range of induced voltages is narrow. Thus, the armature current cannot quickly be reduced.

As a countermeasure against this, it is considered that the inductance of the wirings is reduced.

However, the leakage inductance of the windings themselves are regulated owing to the structural conditions. Moreover, the magnitude thereof is low. Therefore, it is sufficient for reducing the inductance of the windings to reduce inductance called "q-axis inductance", which is generated according to the coupling between the rotor core and the armature windings.

The first embodiment is based on this principle. The leakage magnetic flux of the permanent magnets 10 is reduced by arranging the permanent magnets like convex Vs with respect to the rotor axis and by providing nearly V-shaped recess portions each of which is formed in the outer circumferential portion of the rotor core and between adjacent poles. Thus, torque due to magnetic flux generated by the permanent magnets is increased. Moreover, armature reaction magnetic flux produced by an armature current is reduced.

Thus, the q-axis inductance decreases. Furthermore, the armature current commutation is quickly achieved. Consequently, according to the present invention, there is provided a permanent magnet rotating electric machine that can stably be driven even when the electric machine is driven by the position sensorless inverter in the case of 120 degree energization.

Further, the experiments reveals that as the ratio ($\theta_2/\theta_4$) is gradually reduced from 75.5% to 55% through 66.7%, the commutation operation becomes stable more and more, and that a limit point, at which the motor efficiency also decreases, appears. From the viewpoint of stabilization of the commutation operation and enhancement of the motor efficiency, the optimal range of values of this ratio ($\theta_2/\theta_4$) is from 85.7% to 66.7% at which equal motor efficiency is obtained. When this ratio ($\theta_2/\theta_4$) is set within such a range of 66.7% to 85.7%, the motor efficient can be enhanced by about 1.5%. An angle corresponding to the lowest value of the ratio ($\theta_2/\theta_4$), namely, 66.7% is determined as a value of an angle $\theta_3$ that both outermost-circumferential-side outer end surfaces of the adjacent permanent magnet inserting holes, which are arranged like a letter V, form with the rotor axis.

Second Embodiment

Figure 4:
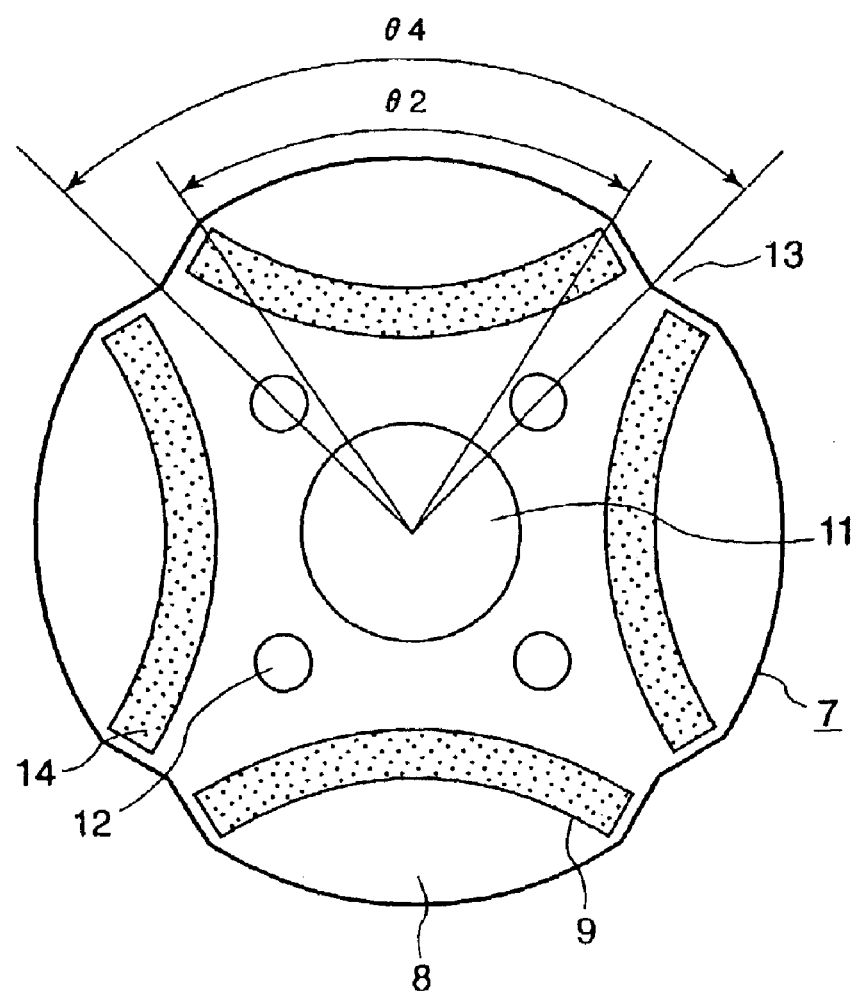
FIG. 4 is an enlarged radially sectional view of a rotor 7 of a permanent magnet rotating electric machine according to a second embodiment of the present invention.

FIG. 4 is an enlarged radially sectional view of a rotor 7 of a permanent magnet rotating electric machine according to a second embodiment of the present invention. As shown in FIG. 2, the difference between the second embodiment shown in FIG. 4 and the first embodiment shown in FIG. 2 resides in that the permanent magnets 10 of the first embodiment are replaced with U-shaped permanent magnets 14 in the second embodiment.

The second embodiment have effects similar to those of the first embodiment shown in FIG. 1.

Third Embodiment

Figure 5:
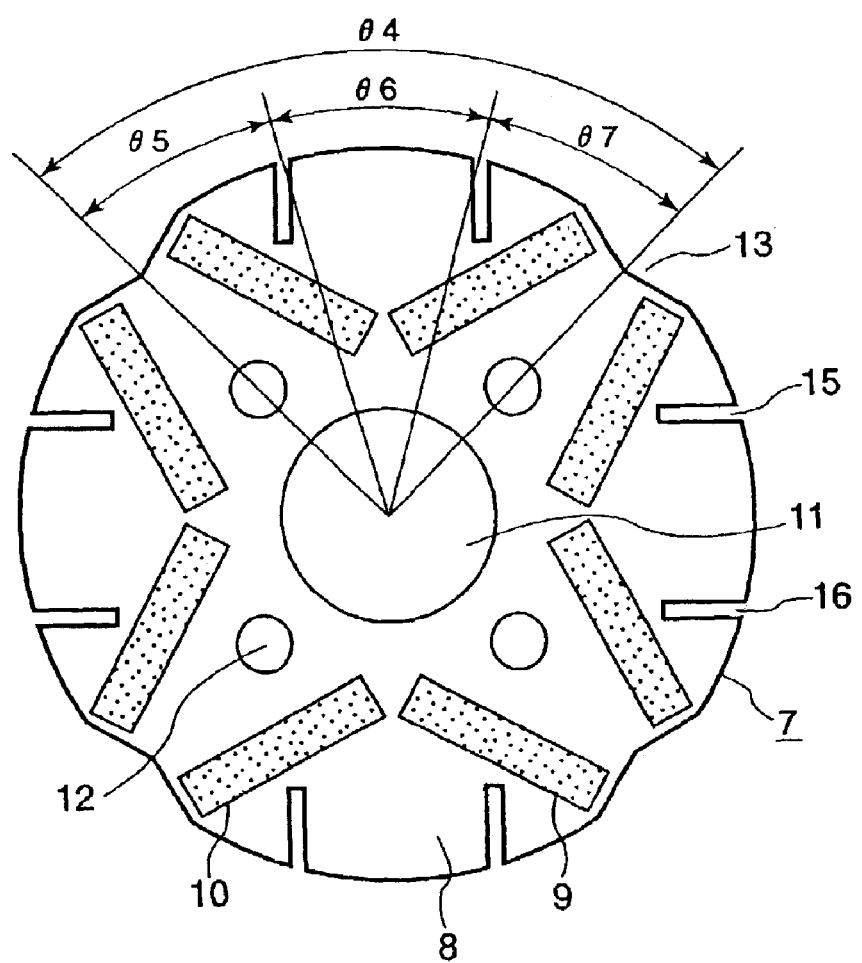
FIG. 5 is an enlarged radially sectional view of a rotor 7 of a permanent magnet rotating electric machine according to a third embodiment of the present invention.

FIG. 5 is an enlarged radially sectional view of a rotor 7 of a permanent magnet rotating electric machine according to a third embodiment of the present invention. The third embodiment shown in FIG. 5 differs from the first embodiment shown in FIG. 2 in that slits 15 and 16 are formed at points outwardly located from the permanent magnets 10 of each pair, which are arranged like a letter "V", so that such points are points of intersection of the outer circumference of a section of the rotor and trisectors of the angle $\theta_4$ to be trisected into angles $\theta_5$, $\theta_6$, and $\theta_7$ (that is, $\theta_4/3=\theta_5=\theta_6=\theta_7$).

In the case of the third embodiment, the armature reaction magnetic flux generated by the armature current is reduced still more, as compared with the first embodiment shaped as illustrated in FIG. 2. Thus, q-axis inductance is reduced still more. Consequently, the armature current commutation is achieved more quickly.

Fourth Embodiment

Figure 6:
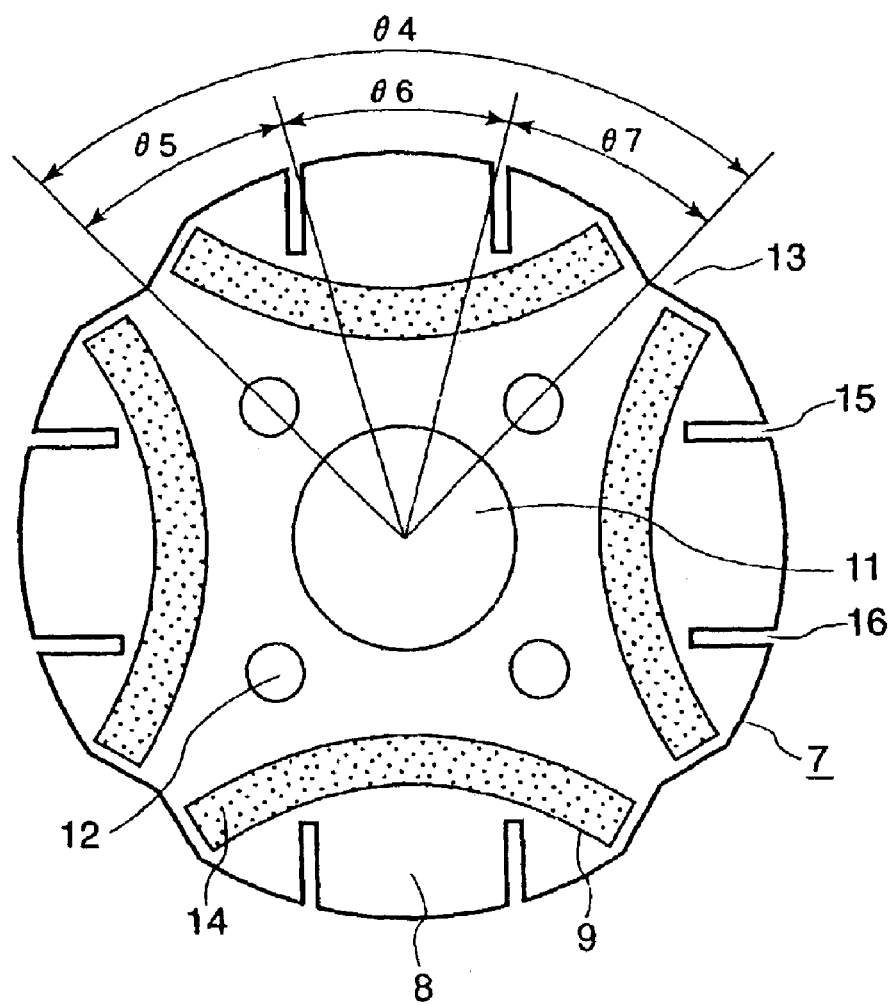
FIG. 6 is an enlarged radially sectional view of a rotor 7 of a permanent magnet rotating electric machine according to a fourth embodiment of the present invention.

FIG. 6 is an enlarged radially sectional view of a rotor 7 of a permanent magnet rotating electric machine according to a fourth embodiment of the present invention. The fourth embodiment shown in FIG. 6 differs from the second embodiment shown in FIG. 4 in that slits 15 and 16 are formed at points outwardly located from the permanent magnets 10 of each pair, which are arranged like a letter "V", so that such points are points of intersection of the outer circumference of a section of the rotor and trisectors of the angle $\theta_4$ to be trisected into angles $\theta_5$, $\theta_6$, and $\theta_7$ (that is, $\theta_4/3=\theta_5=\theta_6=\theta_7$).

In the case of the fourth embodiment, the armature reaction magnetic flux generated by the armature current is reduced still more, as compared with the second embodiment shaped as illustrated in FIG. 4. Thus, q-axis inductance is reduced still more. Consequently, the armature current commutation is achieved more quickly.

Fifth Embodiment

Figure 7:
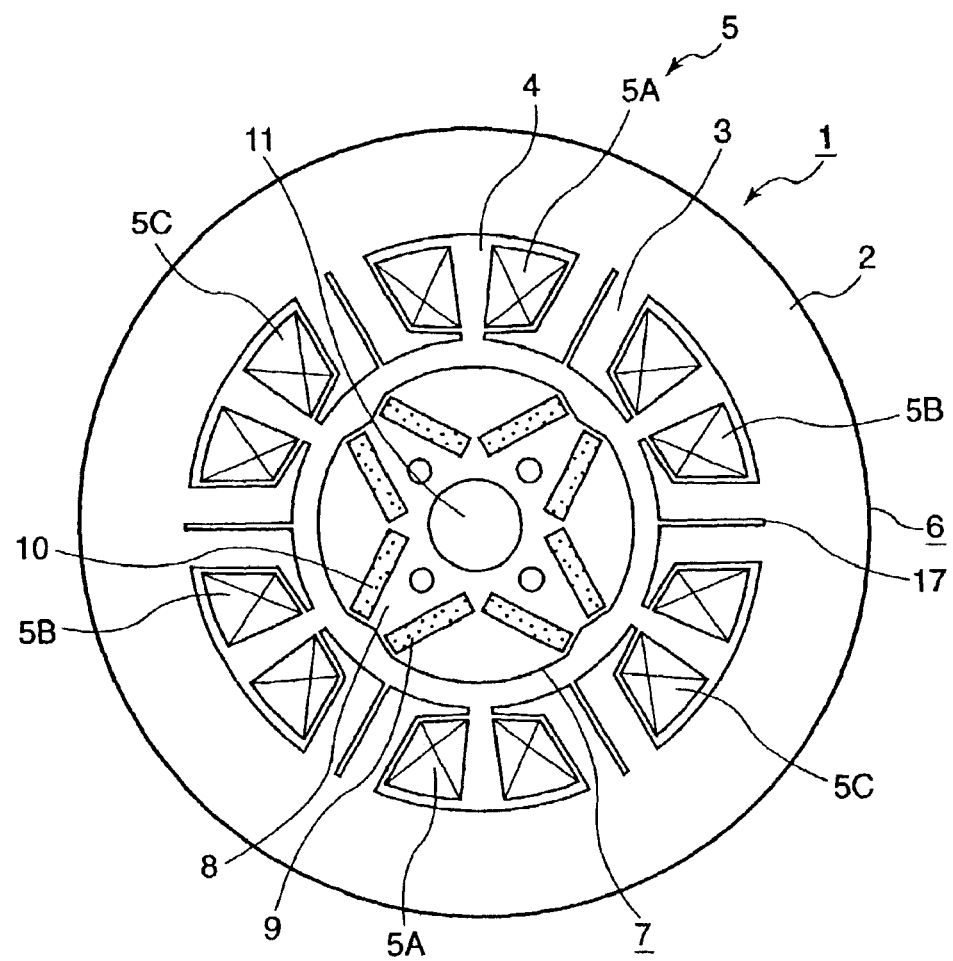
FIG. 7 is an enlarged radially sectional view of a rotor 7 of a permanent magnet rotating electric machine according to a fifth embodiment of the present invention.

FIG. 7 is an enlarged radially sectional view of a rotor 7 of a permanent magnet rotating electric machine according to a fifth embodiment of the present invention. The fifth embodiment shown in FIG. 7 differs from the first embodiment shown in FIG. 1 in that a stator slit 17 is formed in a central portion of each of the teeth 3 of the stator 2.

In the case of the fifth embodiment, each of the stator slits 17 acts in such a way as to reduce the leakage magnetic flux of the permanent magnets 10, as compared with the first embodiment shown in FIG. 1. Thus, torque due to the magnetic flux generated by the magnets is increased. Consequently, the motor efficiency is enhanced.

Sixth Embodiment

Figure 8:
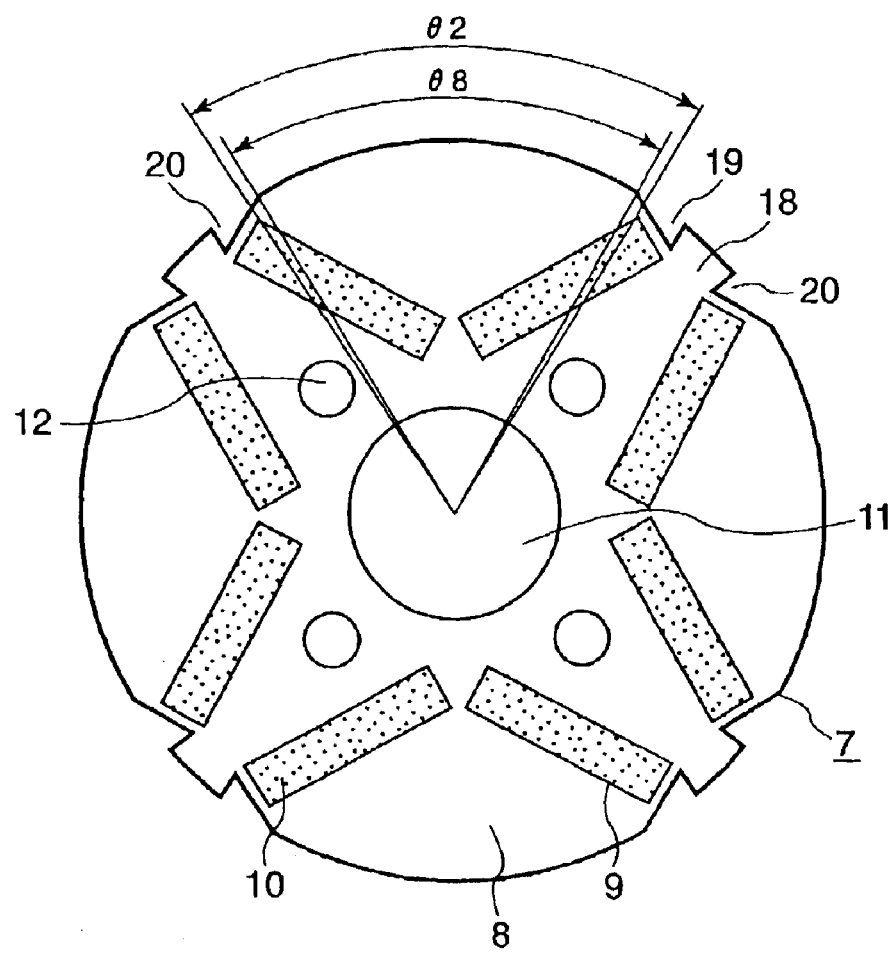
FIG. 8 is an enlarged radially sectional view of a rotor 7 of a permanent magnet rotating electric machine according to a sixth embodiment of the present invention.

FIG. 8 is an enlarged radially sectional view of a rotor 7 of a permanent magnet rotating electric machine according to a sixth embodiment of the present invention. The sixth embodiment shown in FIG. 8 differs from the first embodiment of FIG. 2 in that an angle $\theta_8$ between segments respectively drawn from the rotor axis to both points of intersection of the outer circumferential surface of the rotor 7 and V-shaped recess portions 19 and 20, and an angle $\theta_2$ between segments respectively drawn from the rotor axis to both outermost-circumference-side inner end surfaces of the permanent magnets 10 of each pair, which are arranged like a letter "V", are set in such a manner as to meet the condition: $\theta_8 < \theta_2$. Consequently, a convex portion 18 is formed between the permanent magnets 10 of each pair, which are arranged like a letter "V".

In the case of the sixth embodiment, both armature reaction magnetic flux generated by an armature current and q-axis inductance are slightly higher than those obtained in the first embodiment shaped as illustrated in FIG. 1. Taking all things into consideration, the q-axis inductance is slightly reduced, as compared with the first embodiment. Thus, the armature current commutation is quickly achieved.

Seventh Embodiment

Figure 9:
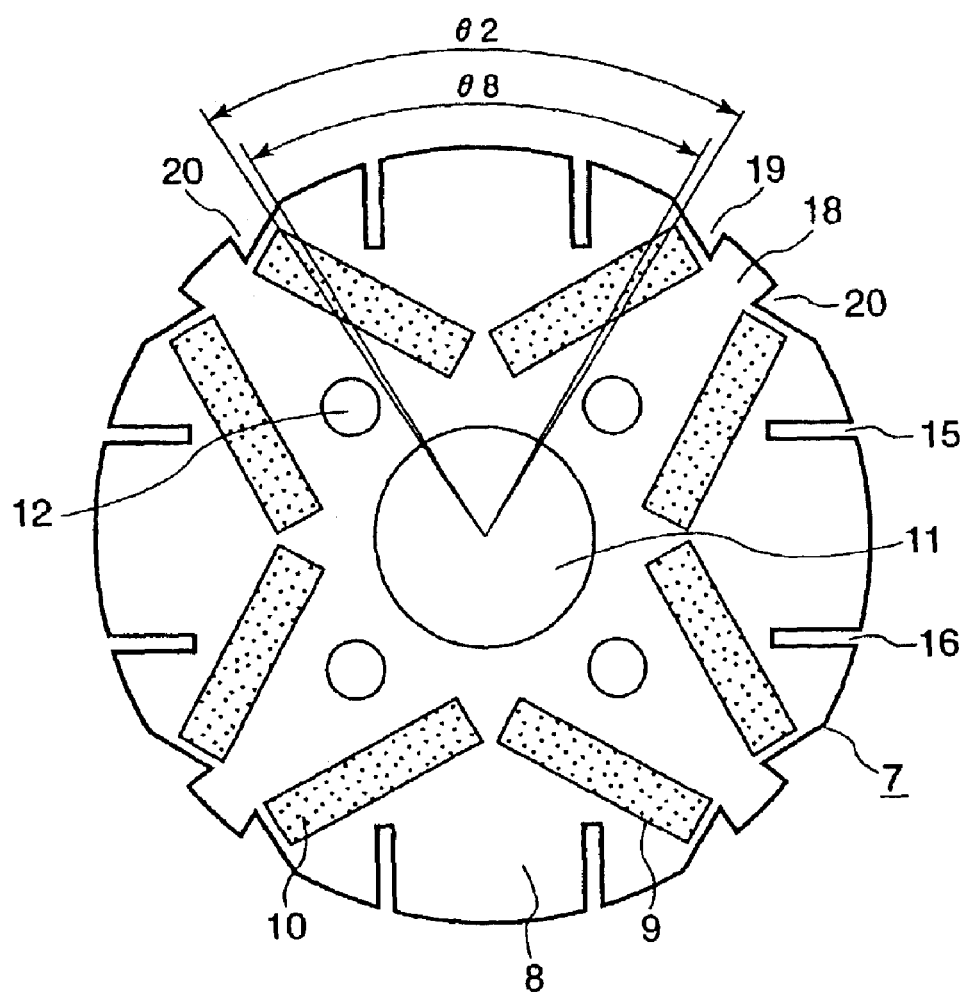
FIG. 9 is an enlarged radially sectional view of a rotor 7 of a permanent magnet rotating electric machine according to a seventh embodiment of the present invention.

FIG. 9 is an enlarged radially sectional view of a rotor 7 of a permanent magnet rotating electric machine according to a seventh embodiment of the present invention. The seventh embodiment shown in FIG. 9 differs from the sixth embodiment of FIG. 8 in that slits 15 and 16 are formed at places outwardly located from the permanent magnets 10 of each pair, which are arranged like a letter "V".

In the case of the seventh embodiment, armature reaction magnetic flux generated y an armature current is reduced still more, as compared with the case of the sixth embodiment shown in FIG. 8. Thus, the q-axis inductance is reduced still more. Consequently, the armature current commutation is quickly achieved.

Eighth Embodiment

Figure 10:
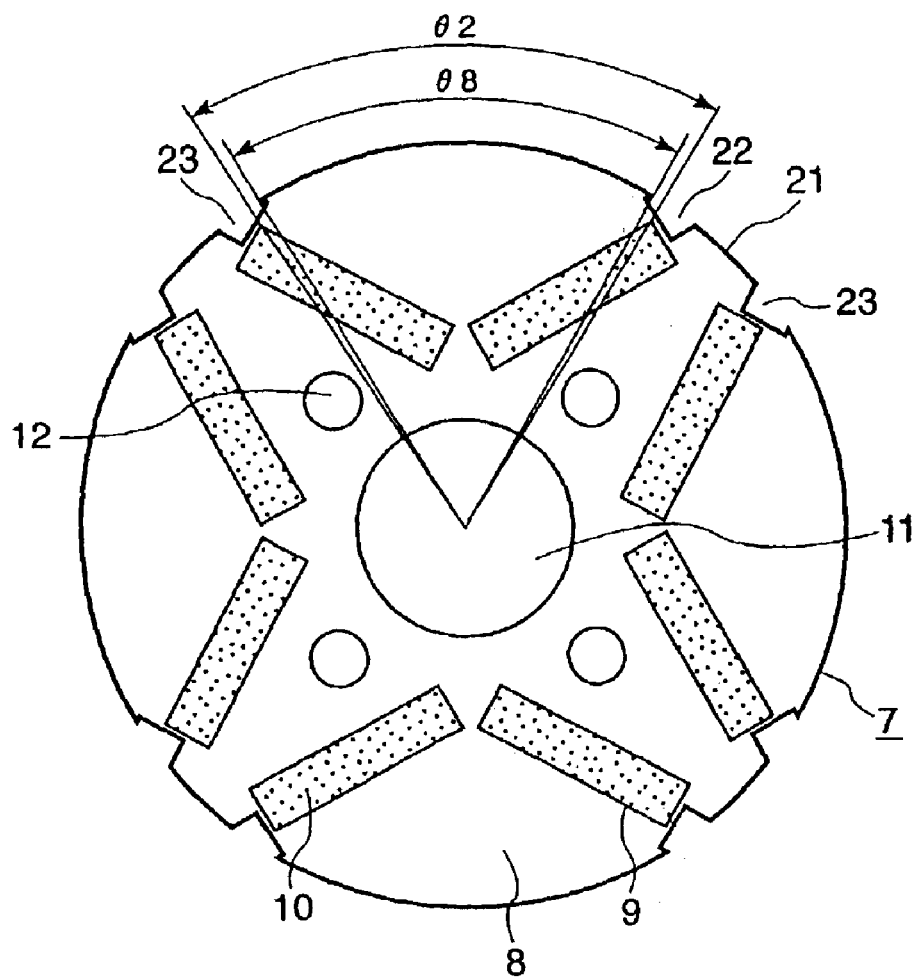
FIG. 10 is an enlarged radially sectional view of a rotor 7 of a permanent magnet rotating electric machine according to an eighth embodiment of the present invention.

FIG. 10 is an enlarged radially sectional view of a rotor 7 of a permanent magnet rotating electric machine according to an eighth embodiment of the present invention. The eighth embodiment shown in FIG. 10 differs from the sixth embodiment of FIG. 8 in that an angle $\theta_8$ between segments respectively drawn from the rotor axis to both points of intersection of the outer circumferential surface of the rotor 7 and V-shaped recess portions 19 and 20 form with a rotor axis, and an angle $\theta_2$ between segments respectively drawn from the rotor axis to both outermost-circumference-side inner end surfaces of the permanent magnets 10 of each pair, which are arranged like a letter "V", are set in such a manner as to meet the condition: $\theta_8 < \theta_2$. Moreover, the eighth embodiment differs from the sixth embodiment in that the radial positions of L-shaped recess portions 22 and 23 are shifted from those of the permanent magnet inserting holes 9 of each pair, respectively. Thus, a convex portion 21 is formed between the L-shaped recess portions 22 and 23 of each pair.

In the case of the eighth embodiment, the armature reaction magnetic flux generated by an armature current and the q-axis inductance are slightly higher that those obtained in the case of the sixth embodiment shown in FIG. 8. Taking all things into consideration, the q-axis inductance is slightly reduced, as compared with the sixth embodiment. Thus, the armature current commutation is quickly achieved.

Ninth Embodiment

Figure 11:
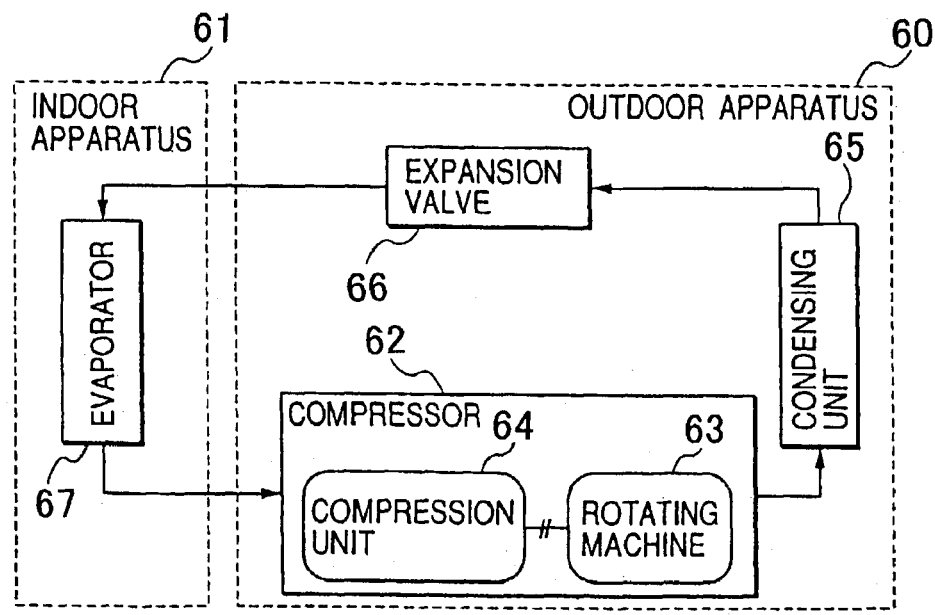
FIG. 11 is a block diagram showing the refrigeration cycle of an air conditioner in accordance with the present invention utilizing a permanent magnet rotating machine according to an embodiment of the present invention.

FIG. 11 is a block diagram showing the refrigeration cycle of an air conditioner as an embodiment of the permanent magnet rotating electric machine according to this invention. The air conditioner consists of an outdoor apparatus 60 and an indoor apparatus 61. The outdoor apparatus 60 has a compressor 62, condensing unit 65, and expansion valve 66. The compressor 62 seals a compression unit 64 and a permanent magnet rotating electrical machine 63 which corresponds to the permanent magnet rotating electrical machine 1 in FIG. 1 of this invention, for example. The indoor apparatus 61 includes evaporator 67.

The freezing cycle allows refrigerant to be circulated in an arrow-marked direction. The compressor 62 compresses the refrigerant. Then heat exchange is performed between the outdoor apparatus 60 comprising the condensing unit 65 and the expansion valve 66, and the indoor apparatus 61 consisting of the evaporator 67, whereby cooling function is performed.

Figure 12:
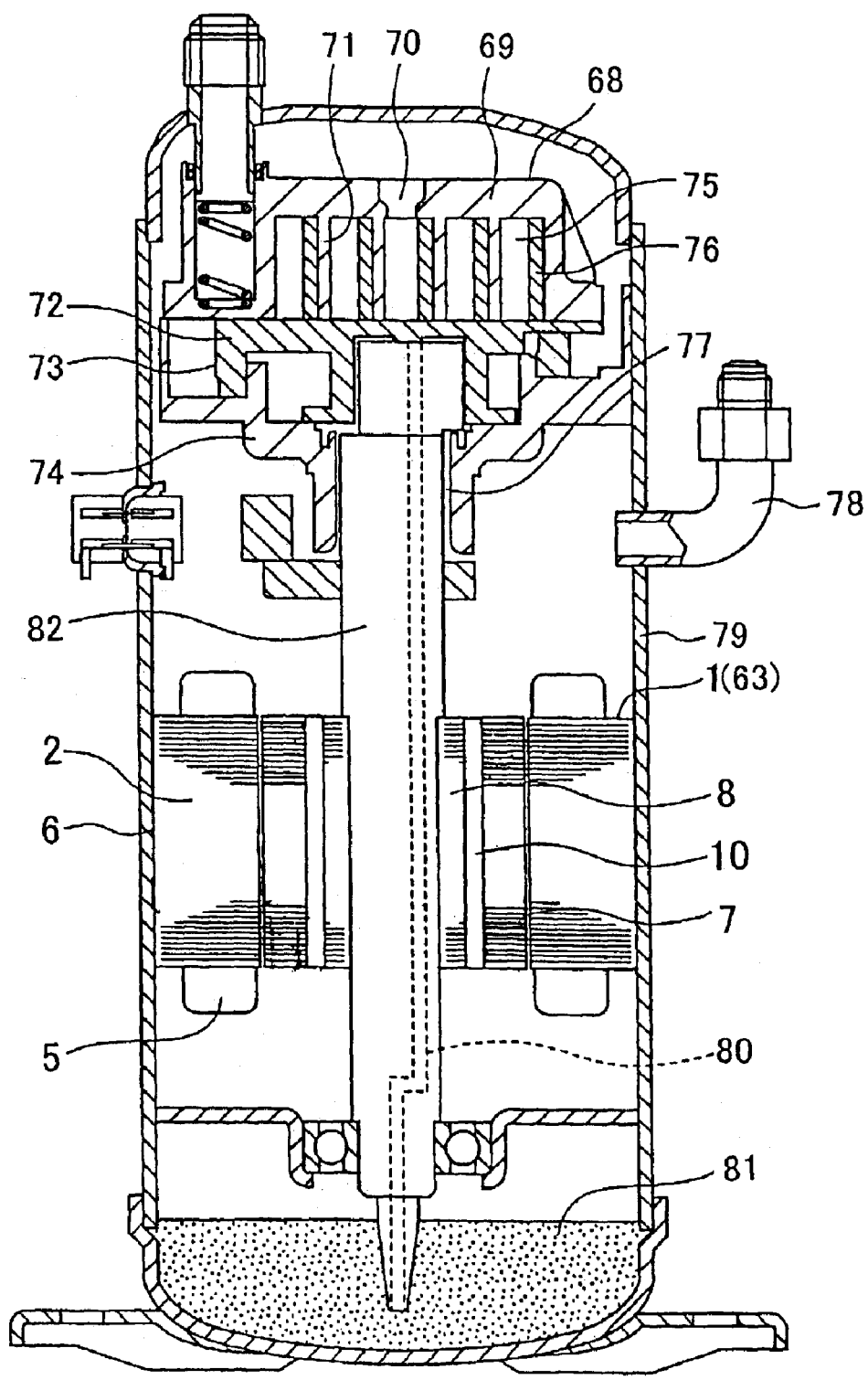
FIG. 12 is a longitudinal sectional view of a compressor of FIG. 11.

FIG. 12 is a longitudinal section of the compressor 62. The permanent magnet rotating electrical machine 63 is sealed in the pressure vessel 79 and adapted to rotate at a constant speed as a prime mover for the compress operation describe above. The permanent magnet rotating electrical machine 63 includes a stator 6. The stator 6 comprises a stator core 2, and armature windings 5 wound in a plurality of slots that are formed in the stator core 2 together with teeth. The rotor core 8, and permanent magnets 10.

The compression unit 64 includes a spiral lap 71 formed downright from the end plate 69 of a fixed scroll member 68, in engaged relation with a spiral lap 76 formed upright on the end plate 72 of a swivel scroll member 73. The swivel scroll member 73 is swiveled by a crankshaft 82, and compresses the refrigerant. A compression chamber 75 is located on the outermost diameter.

The compression chamber 75 is compressed by the swivel motion in such a manner as to reduce the volume progressively toward the center of the fixed scroll member 68 and the swivel scroll member 73. The compressed gas in the compression chamber 75 is discharged from an outlet 70 communicating with the central portion of the compression chamber 75.

The compressed gas thus discharged enters the part of a pressure vessel 79 under a frame 74 through a gas passage (not shown) formed in the fixed scroll member 68 and the frame 74. Then the compressed gas is released out of the compressor 62 by way of a discharge pipe 78 arranged on the side wall of the pressure vessel 79.

An oil pool 81 is formed under the permanent magnet rotating electrical machine 63. The oil in the oil pool 81 is supplied for lubrication of the sliding part, the sliding bearing 77, etc. between the swivel scroll member 73 and the crankshaft 82 through an oil hole 80 formed in the crankshaft 82.

In the aforementioned embodiments of the present invention, the adjoining permanent magnets are arranged like a convex "U" or "V" with respect to the rotor axis. Further, nearly V-shaped or L-shaped recess portions are formed between adjacent poles in the outer circumferential portion of the rotor core. Thus, torque due to the magnetic flux generated by the magnets is increased. Moreover, the armature reaction magnetic flux generated by the armature current is reduced. Consequently, the q-axis inductance is reduced. Moreover, the armature current commutation is quickly achieved. Thus, there is provided a permanent magnet rotating electric machine that is, stably driven even when a position sensorless inverter in the case of 120 degree energization is used for driving the rotating electric machine.

Although the preferred embodiments of the present invention have been described above, it should be understood that the present invention is not limited thereto and that other modifications will be apparent to those skilled in the art without departing from the spirit of the invention. The scope of the present invention, therefore, should be determined solely by the appended claims.

What is claimed is:

1. An air conditioner comprising a compressor including a compression unit and a permanent magnet rotating electric machine,
   wherein the permanent magnet rotating electric machine includes a stator, into which concentratively wound armature windings are inserted irk such a way as to surround a plurality of teeth formed in a stator core, and a rotor having permanent magnets accommodated into a plurality of permanent magnet inserting holes formed in a rotor core,
   wherein each pair of adjacent ones of said permanent magnets is arranged generally in one of a convex V-shaped configuration and a convex U-shaped configuration with respect to a rotor axis, and
   wherein a substantially V-shaped recess portion is formed between adjacent poles in outer circumferential surface portions of said rotor core.

2. An air conditioner according to claim 1, wherein a plurality of slits radially extending in said rotor are formed in an outer circumferential portion, which is located outwardly from said permanent magnets, of said rotor core.

3. An air conditioner according to claim 1, wherein a slit radially extending in said rotor is formed in a central portion of each of said teeth of said stator core.

4. An air conditioner according to claim 1,
   wherein a slit radially extending in said rotor is formed in a central portion of each of said teeth of said stator core, and
   wherein a plurality of slits radially extending in said rotor are formed in an outer circumferential portion, which is located outwardly from said permanent magnets, of said rotor core.

5. An air conditioner according to claim 1,
   wherein a plurality of substantially V-shaped recess portions, each of which is placed between adjacent poles, are formed in outer circumferential surface portions of said rotor core, and
   wherein a plurality of slits radially extending in said rotor are formed in an outer circumferential portion, which is located outwardly from said permanent magnets, of said rotor core.

6. An air conditioner according to claim 1, wherein a plurality of substantially L-shaped recess portions, each of which is placed between adjacent poles, are formed in outer circumferential surface portions of said rotor core.

7. An air conditioner according to claim 1,
   wherein a plurality of substantially L-shaped recess portions, each of which is placed between adjacent poles, are formed in outer circumferential surface portions of said rotor core, and
   wherein a plurality of slits radially extending in said rotor are formed in an outer circumferential portion, which is located outwardly from said permanent magnets, of said rotor core.

8. An air conditioner according to claim 1, wherein a slit radially extending in said rotor is formed in a central portion of each of said teeth of said stator core.

9. An air conditioner according to claim 1,
   wherein a plurality of substantially V-shaped recess portions, each of which is placed between adjacent poles of each pair, are formed in outer circumferential surface portions of said rotor core, and
   wherein a plurality of slits radially extending in said rotor are formed in an outer circumferential portion, which is located outwardly from said permanent magnets, of said rotor core.

10. An air conditioner according to claim 1, wherein a plurality of substantially L-shaped recess portions, each of which is placed between adjacent poles of each pair, are formed in outer circumferential surface portions of said rotor core.

11. An air conditioner according to claim 1,
    wherein a slit radially extending in said rotor is formed in a central portion of each of said teeth of said stator core,
    wherein a plurality of substantially L-shaped recess portions, each of which is placed between adjacent poles of each pair, are formed in outer circumferential surface portions of said rotor core, and
    wherein a plurality of slits radially extending in said rotor are formed in an outer circumferential portion, which is located outwardly from said permanent magnets, of said rotor core.

12. An air conditioner according to claim 1,
    wherein a convex portion core is placed between a plurality of substantially V-shaped recess portions formed in outer circumferential surface portions of said rotor core, and
    wherein a width of an innermost-circumference-side part of said convex portion core is larger than an outermost-circumference-side circumferential distance between said permanent magnet inserting holes.

13. An air conditioner according to claim 1,
    wherein a plurality of substantially V-shaped recess portions, each of which is placed between adjacent poles of each pair, are formed in outer circumferential surface portions of said rotor core,
    wherein a plurality of slits radially extending in said rotor are formed in an outer circumferential portion, which is located outwardly from said permanent magnets, of said rotor core,
    wherein a convex portion core is placed between said plurality of substantially V-shaped recess portions formed in outer circumferential surface portions of said rotor core, and
    wherein a width of an innermost-circumference-side part of said convex portion core is larger than an outermost-circumference-side circumferential distance between said permanent magnet inserting holes.

14. An air conditioner according to claim 1,
    wherein a plurality of substantially L-shaped recess portions, each of which is placed between adjacent poles of each pair, are formed in outer circumferential surface portions of said rotor core,
    wherein a convex portion core is placed between said plurality of substantially L-shaped recess portions formed in outer circumferential surface portions of said rotor core, and
    wherein a width of an innermost-circumference-side part of said convex portion core is larger than an outermost-circumference-side circumferential distance between said permanent magnet inserting holes.

15. An air conditioner according to claim 1,
    wherein a plurality of slits radially extending in said rotor are formed in an outer circumferential portion, which is located outwardly from said permanent magnets, of said rotor core, wherein a convex portion core is placed between a plurality of substantially L-shaped recess portions formed in outer circumferential surface portions of said rotor core, and wherein a width of an innermost-circumference-side part of said convex portion core is larger than an outermost-circumference-side circumferential distance between said permanent magnet inserting holes.

16. An air conditioner according to claim 1, wherein a plurality of substantially V-shaped recess portions, each of which is placed between adjacent poles of each pair, are formed in outer circumferential surface portions of said rotor core, wherein a convex portion core is placed between said plurality of substantially V-shaped recess portions formed in outer circumferential surface portions of said rotor core, and wherein a width of an innermost-circumference-side part of said convex portion core is larger than an outermost-circumference-side circumferential distance between said permanent magnet inserting holes.

17. An air conditioner according to claim 1, wherein a slit radially extending in said rotor is formed in a central portion of each of said teeth of said stator core, wherein a plurality of substantially V-shaped recess portions, each of which is placed between adjacent poles of each pair, are formed in outer circumferential surface portions of said rotor core, wherein a plurality of slits radially extending in said rotor are formed in an outer circumferential portion, which is located outwardly from said permanent magnets, of said rotor core, wherein a convex portion core is placed between said plurality of substantially V-shaped recess portions formed in outer circumferential surface portions of said rotor core, and wherein a width of an innermost-circumference-side part of said convex portion core is larger than an outermost-circumference-side circumferential distance between said permanent magnet inserting holes.

18. An air conditioner according to claim 1, wherein a plurality of substantially L-shaped recess portions, each of which is placed between adjacent poles of each pair, are formed in outer circumferential surface portions of said rotor core.

19. An air conditioner according to claim 1, wherein a plurality of substantially L-shaped recess portions, each of which is placed between adjacent poles of each pair, are formed in outer circumferential surface portions of said rotor core, wherein a plurality of slits radially extending in said rotor are formed in an outer circumferential portion, which is located outwardly from said permanent magnets, of said rotor core, wherein a convex portion core is placed between said plurality of substantially L-shaped recess portions formed in outer circumferential surface portions of said rotor core, and wherein a width of an innermost-circumference-side part of said convex portion core is larger than an outermost-circumference-side circumferential distance between said permanent magnet inserting holes.

20. An air conditioner according to claim 1, wherein a ratio ($\theta 2/\theta 4$) of an angle $\theta 2$ between segments respectively drawn from said rotor axis to both points of intersection of said outer circumferential surface of said rotor core and said substantially V-shaped recess portion, to a value $\theta 4$ obtained by dividing 360 (deg.) by the number of poles is set so that $66.7\% \leq (\theta 2/\theta 4) \leq 85.7\%$.

21. An air conditioner according to claim 1, wherein a plurality of slits radially extending in said rotor are formed in an outer circumferential portion, which is located outwardly from said permanent magnets, of said rotor core, and wherein a ratio ($\theta 2/\theta 4$) of an angle $\theta 2$ between segments respectively drawn from said rotor axis to both points of intersection of said outer circumferential surface of said rotor core and said substantially V-shaped recess portion, to a value $\theta 4$ obtained by dividing 360 (deg.) by the number of poles is set so that $66.7\% \leq (\theta 2/\theta 4) \leq 85.7\%$.

22. An air conditioner according to claim 1, wherein a plurality of substantially V-shaped recess portions, each of which is placed between adjacent poles of each pair, are formed in outer circumferential surface portions of said rotor core, and wherein a ratio ($\theta 2/\theta 4$) of an angle $\theta 2$ between segments respectively drawn from said rotor axis to both points of intersection of said outer circumferential surface of said rotor core and said V-shaped recess portion, to a value $\theta 4$ obtained by dividing 360 (deg.) by the number of poles is set so that $66.7\% \leq (\theta 2/\theta 4) \leq 85.7\%$.

23. An air conditioner according to claim 1, wherein a plurality of substantially L-shaped recess portions, each of which is placed between adjacent poles of each pair, are formed in outer circumferential surface portions of said rotor core, and wherein a ratio ($\theta 2/\theta 4$) of an angle $\theta 2$ between segments respectively drawn from said rotor axis to both points of intersection of said outer circumferential surface of said rotor core and said substantially L-shaped recess portion, to a value $\theta 4$ obtained by dividing 360 (deg.) by the number of poles is set so that $66.7\% \leq (\theta 2/\theta 4) \leq 85.7\%$.

24. An air conditioner according to claim 1, wherein a plurality of slits radially extending in said rotor are formed in an outer circumferential portion, which is located outwardly from said permanent magnets, of said rotor core.

25. An air conditioner according to claim 1, wherein at least one of a substantially V-shaped and of a substantially L-shaped recess portion is formed proximate to adjacent poles in an outer circumferential surface portion of said rotor core.

26. An air conditioner according to claim 25, wherein one of a plurality of substantially V-shaped and substantially L-shaped recess portions are formed in outer circumferential surface portions of said rotor core.

27. An air conditioner according to claim 1, wherein at least one of a substantially V-shaped and a substantially L-shaped recess portion is formed proximate to adjacent poles in an outer circumferential surface portion of said rotor core, and wherein a ratio ($\theta 2/\theta 4$) of an angle $\theta 2$ between segments respectively drawn from said rotor axis to both points of intersection of said outer circumferential surface of said rotor core and said at least one of the substantially V-shaped and of the substantially L-shaped recess portion, to a value $\theta 4$ obtained by dividing 360 (deg.) by the number of poles is set so that $66.7\% \leq (\theta 2/\theta 4) \leq 85.7\%$.

28. An air conditioner according to claim 1, wherein at least one of a substantially V-shaped and a substantially L-shaped recess portion is formed proximate to adjacent poles in an outer circumferential surface portion of said rotor core, and wherein one of a plurality of substantially V-shaped and substantially L-shaped recess portions are formed in outer circumferential surface portions of said rotor core, and wherein a ratio ($\theta 2/\theta 4$) of an angle $\theta 2$ between segments respectively drawn from said rotor axis to both points of intersection of said outer circumferential surface of said rotor core and said at least one of the V-shaped and of the substantially L-shaped recess portion, to a value $\theta 4$ obtained by dividing 360 (deg.) by the number of poles is set so that $66.7\% \leqq (\theta 2/\theta 4) \leqq 85.7\%$.

29. An air conditioner according to claim 28, wherein one of a plurality of substantially V-shaped and substantially L-shaped recess portions are formed in outer circumferential surface portions of said rotor core.

30. An air conditioner according to claim 25, wherein a plurality of slits radially extending in said rotor are formed in an outer circumferential portion, which is located outwardly from said permanent magnets, of said rotor core.

31. An air conditioner according to claim 26, wherein a plurality of slits radially extending in said rotor are formed in an outer circumferential portion, which is located outwardly from said permanent magnets, of said rotor core.

32. An air conditioner according to claim 25, wherein a slit radially extending in said stator is formed in a central portion of each of said teeth of said stator core.

33. An air conditioner according to claim 1, wherein the air conditioner comprises an outdoor apparatus and an indoor apparatus, the compressor being disposed in the outdoor apparatus.

34. An air conditioner according to claim 33, wherein the outdoor apparatus further includes a condensing unit and expansion valve and the indoor apparatus includes an evaporator.

35. An air conditioner according to claim 33, wherein the compressor includes a pressure vessel sealing the compression unit and the permanent magnet rotating electric machine therein.

36. An air conditioner comprising a compressor including a compression unit and a permanent magnet rotating electric machine, wherein the permanent magnet rotating electric machine includes a stator, into which concentratively wound armature windings are inserted in such a way as to surround a plurality of teeth formed in a stator core, and a rotor having permanent magnets accommodated into a plurality of permanent magnet inserting holes formed in a rotor core, wherein each pair of adjacent ones of said permanent magnets is arranged with respect to a rotor axis, and wherein a plurality of substantially V-shaped recess portions, each of which is placed between adjacent poles of each pair, are formed in outer circumferential surface portions of said rotor core.

* * * * *